(12) United States Patent
Munsters (10) Patent No.: US 6,926,354 B2
(45) Date of Patent: Aug. 9, 2005

(54) OPEN ROOF CONSTRUCTION FOR A VEHICLE, AS WELL AS A VEHICLE FITTED WITH SUCH AN OPEN ROOF CONSTRUCTION

(75) Inventor: Paulus Johannes Wilhelminus Munsters, Uden (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/416,134

(22) PCT Filed: Nov. 9, 2001

(86) PCT No.: PCT/NL01/00813

§ 371 (c)(1),
(2), (4) Date: May 8, 2003

(87) PCT Pub. No.: WO02/38406

PCT Pub. Date: May 16, 2002

(65) Prior Publication Data

US 2004/0021345 A1 Feb. 5, 2004

(30) Foreign Application Priority Data

Nov. 9, 2000 (NL) .............................................. 1016578
Jun. 1, 2001 (NL) .............................................. 1018207

(51) Int. Cl.[7] ................................................. B60J 7/06
(52) U.S. Cl. .................................. 296/219; 296/216.08
(58) Field of Search ...................... 296/216.06–216.08, 296/219

(56) References Cited

U.S. PATENT DOCUMENTS

| 3,333,362 A | 8/1967 | Kostin et al. ................. 49/248 |
| 5,016,939 A | * 5/1991 | Nishikawa et al. ......... 296/219 |
| 5,035,463 A | 7/1991 | Kato et al. .................. 296/223 |
| 5,054,847 A | 10/1991 | Asoh et al. ................. 296/219 |
| 5,058,944 A | 10/1991 | Kim ...................... 296/146.16 |
| 6,457,771 B2 | * 10/2002 | Farber .................... 296/220.01 |

FOREIGN PATENT DOCUMENTS

| DE | 3808910 | 10/1989 | ............ 296/146.14 |
| DE | 4113872 | 10/1992 | ................. 286/219 |
| DE | 196 04 855 | 8/1997 | |
| GB | 444 907 | 3/1936 | |
| IT | 662106 | 4/1964 | ............ 296/107.07 |
| WO | WO 01/14158 A1 | 3/2001 | |
| WO | WO 02/38406 | * 5/2002 | |

* cited by examiner

*Primary Examiner*—Dennis H. Pedder
(74) *Attorney, Agent, or Firm*—Westman, Champlin and Kelly, P.A.; Linda P. Ji (57) ABSTRACT

The invention relates to an open roof construction for a vehicle having a roof opening in its fixed roof, comprising stationary guide rails (1, 5) on either side of the roof opening. Slides (2) are guided rails for movably supporting a closure element of the open roof construction. A cover plate (3) defines the rear side of the roof opening that can be closed by the closure element and provides a seal against the fixed roof. The slides (2) and the cover plate (3) of the open roof construction are interlocked to form one unit in an entirely open position thereof, after which they can be moved further as a unit. The cover plate (3) is mounted on cover plate slides (9) capable of sliding movement in said guide rails (1, 5), which each comprise a height adjusting mechanism (11, 13) to be actuated by an adjacent rear slide (2) of the closure element, which functions to move the cover plate (3) upwards before further movement of the aforesaid unit is possible.

18 Claims, 9 Drawing Sheets

OPEN ROOF CONSTRUCTION FOR A VEHICLE, AS WELL AS A VEHICLE FITTED WITH SUCH AN OPEN ROOF CONSTRUCTION

CROSS-REFERENCE TO RELATED APPLICATION

This Application is a Section 371 National Stage Application of International Application No. PCT/NL01/00813, filed Nov. 9, 2001 and published as WO 02/38406 on May 16, 2002, in English.

BACKGROUND OF THE INVENTION

The present invention relates to an open roof construction for a vehicle. More particularly, the invention relates to an open roof construction having a closure element and a cover plate which defines a rear side of a roof opening.

Such an open roof construction is disclosed in International patent application WO 01/14158. With this known construction, a folding roof is moved to a position on the rear window of a vehicle as a unit, after which the rear window can be swung back into the boot.

SUMMARY OF THE INVENTION

The object of the invention is to provide an open roof construction which is arranged in such a manner as to enable a reliable transition of the closure element from an operative position to a rearwardly moved storage position.

In order to accomplish that objective, an open roof construction according to the invention is characterized in that the cover plate is mounted on cover plate slides capable of sliding movement in guide rails, which each comprise a height adjusting mechanism to be actuated by an adjacent rear slide of the closure element, which functions to move the cover plate upwards before further movement of said unit is possible.

This construction of the cover plate enables the cover plate to provide a seal in the operative position of the closure element, which seal is broken by moving the cover plate upwards, in which position the cover plate is released for being moved to the rear. The upward movement of the cover plate can also be utilized for unlocking the cover plate so as to enable said rearward movement.

Advantageous embodiments of the invention constitute the subject matter of the dependent claims. The invention leads to a very compact operating mechanism near the cover plate, in which a number of parts have more than one function.

BRIEF DESCRIPTION OF THE DRAWINGS

The invention will now be explained in more detail with reference to the drawings, which show an exemplary embodiment of the open roof construction according to the invention.

BRIEF DESCRIPTION OF THE ILLUSTRATIVE EMBODIMENTS

The present invention is intended especially, but not exclusively, for use in an open roof construction for a vehicle such as shown in Dutch Patent Application No. 1016578, whose contents are incorporated herein by reference thereto.

Figure 1:
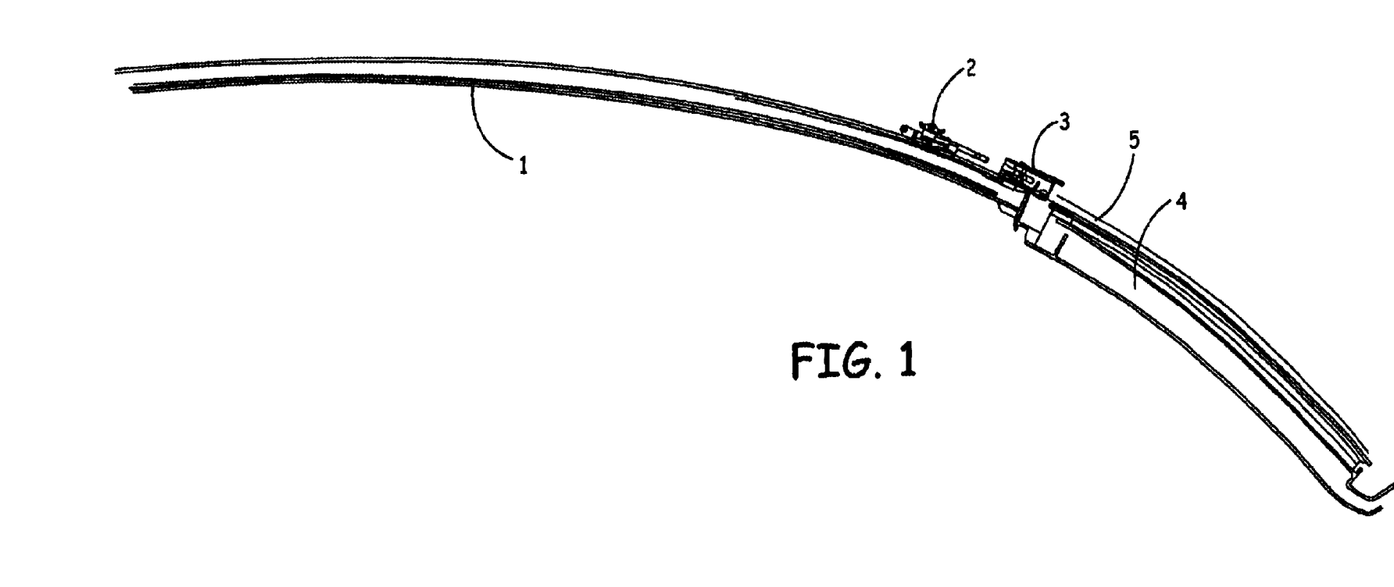
FIG. 1 is a side elevational view of one of the guide rails of the open roof construction, with the cover plate and one slide of the folding roof present therein.
Figure 1A:
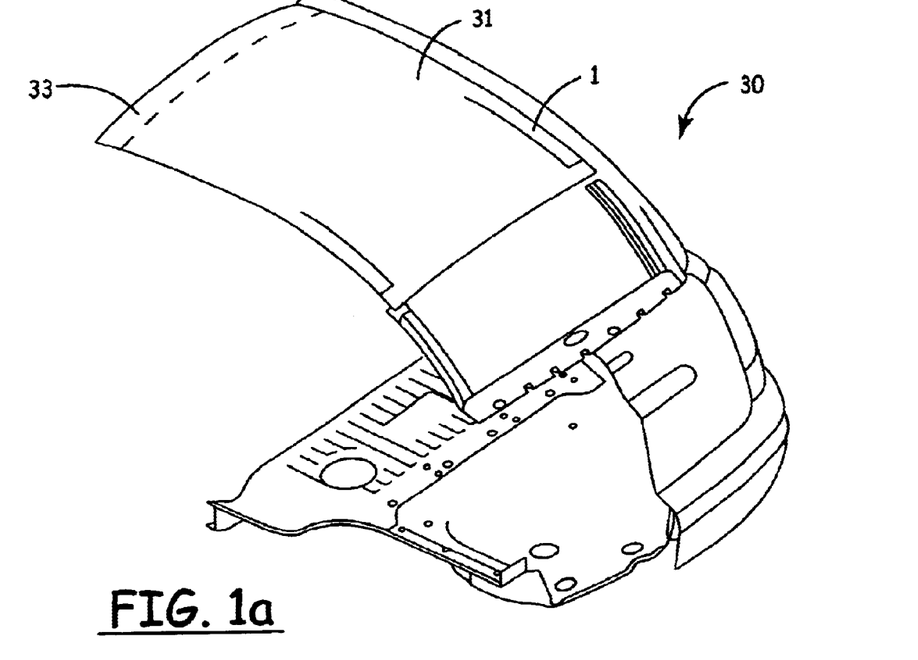
FIG. 1a illustrate a general environment where the present invention is useful.
Figure 1B:
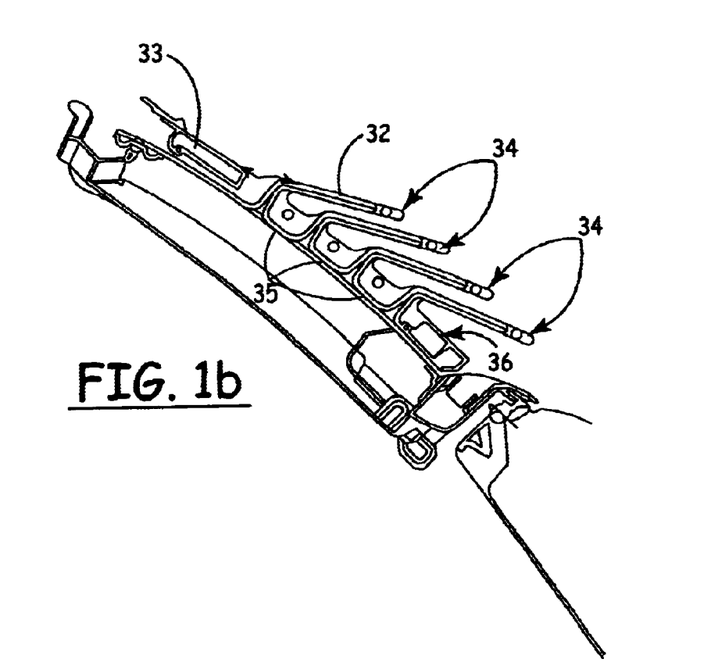
Figure 1C:
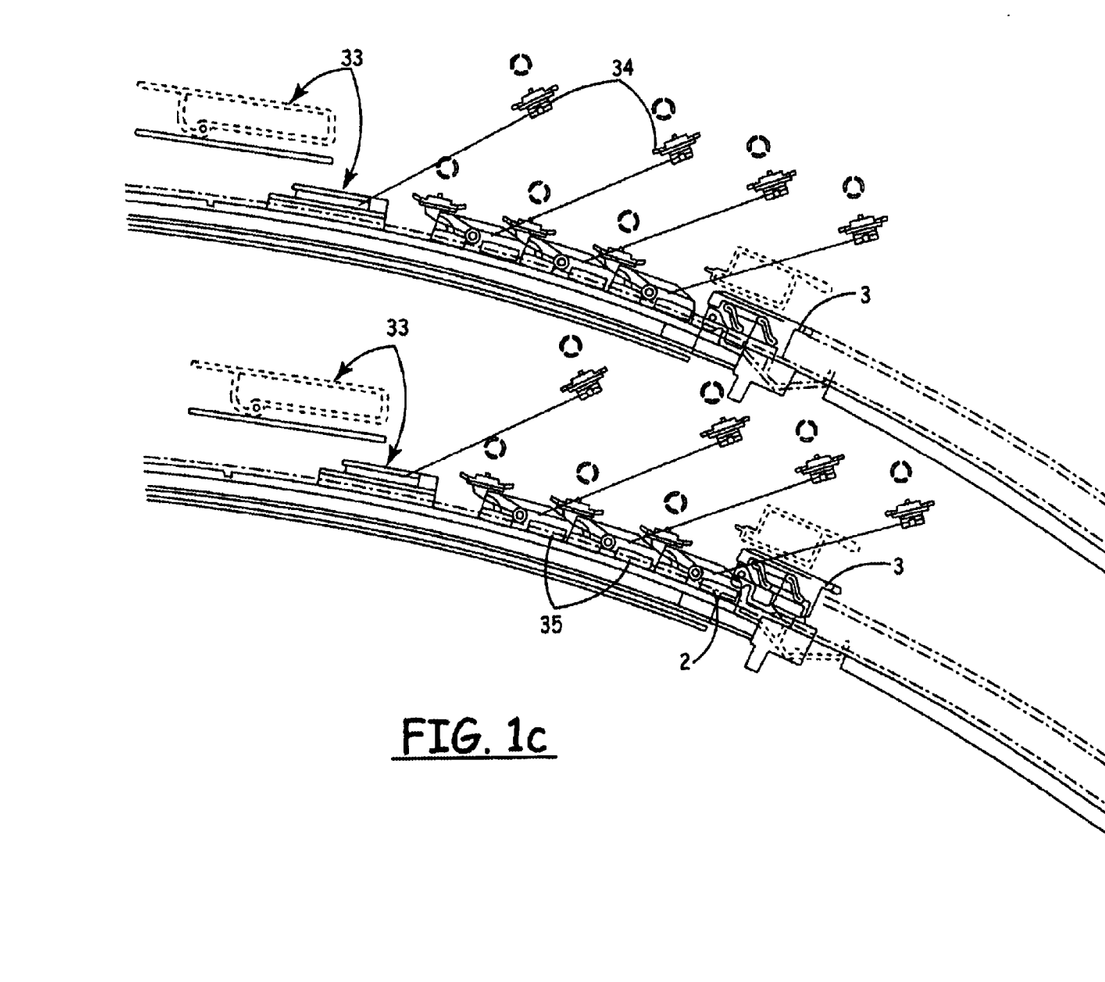

In the illustrative embodiments, the open roof construction or assembly comprises a folding roof 31 in FIG. 1a, which is conventionally provided with stationary guide rails on either side of a roof opening formed in the roof of the vehicle 30 in FIG. 1a. One of said guide rails is indicated by numeral 1 in the drawing. The folding roof furthermore includes foldable or flexible cover sheet or flexible liner 32 in FIG. 1b and a drivable operating beam 33 in FIGS. 1b–1c at the front side of the liner, which operating beam is guided in guide rails 1 for selectively opening and closing the roof opening. A number of folding elements 34 in FIGS. 1b–1c is provided for supporting the liner and defining a folding movement thereof when the folding roof is being opened. These parts of the folding roof are well known. The folding elements 34 are mounted on folding element slides 35 in FIG. 1b, which are guided in the guide rails 1 with rear slide 2, 36 shown in FIGS. 1 and 1b.

The rear side of the folding roof, or the rear side of the roof opening formed by opening the liner, is defined by a cover plate 3 (illustrated in FIG. 1c), which is fixed to the rear side of the liner and which provides a seal against the fixed roof at the rear side of the folding roof. The operating beam, the slides 2, 35, 36 (illustrated in FIGS. 1, and 1b–1c) and the cover plate 3 of the folding roof can be interlocked to form one unit in an entirely open position of the folding roof, which unit can subsequently be moved to a position on a rear window 4 of the vehicle. The rear window 4 is likewise provided with guide rails 5, which are aligned with the guide rails 1 of the vehicle. The operation and the construction of this rear window is described and illustrated in great detail in the aforementioned patent application and therefore will not be discussed in detail herein.

The cover plate 3 must remain stationary during the normal operation of the folding roof and provide a seal at the rear side of the folding roof, but it needs to be lifted from the sealing position and be unlocked in order to enable its movement to the rear window 4, which can be realised by means of the present invention.

Figure 2:
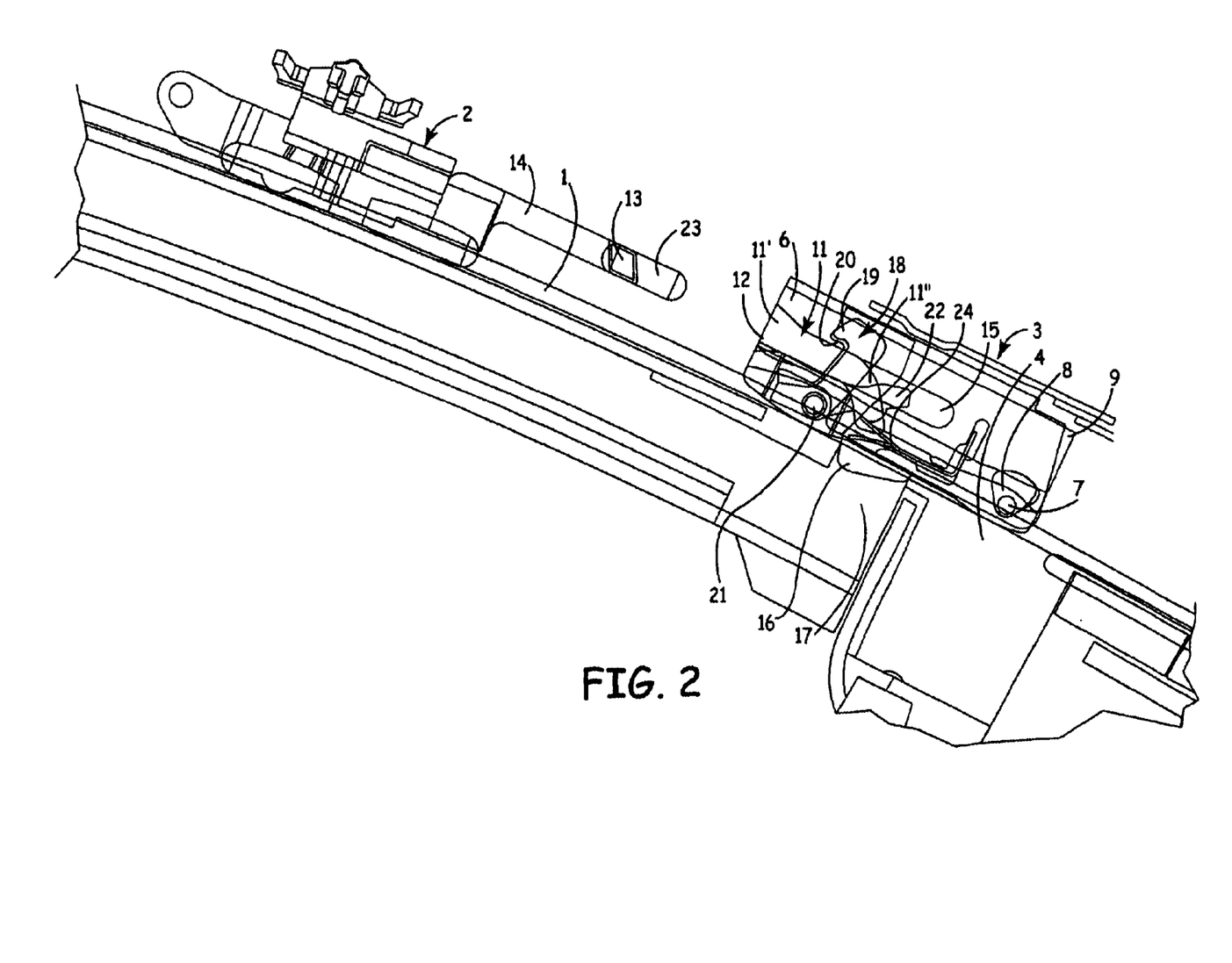
FIGS. 2–7 are larger-scale views of a part of the guide rail, in which the rear side of the folding roof, the cover plate and the slide are shown in various positions thereof, which illustrate the transition of the folding roof from a folded position to a rearwardly moved storage position.

FIG. 2 shows the parts of the cover plate 3 and the slide 2 on a larger scale. As the figure shows, the cover plate 3 is provided with a link plate 6 at the location of the guide rail 1, which link plate includes a pivot pin 7 with a guide cam 8 near its rear side, by means of which the link plate 6 is pivotally mounted on a cover plate slide 9. The guide cam 8 is a tight fit in a guide hole 10, which is inclined at a slightly larger angle than the guide cam 8, thus defining the maximum pivoting angle of the link plate 6.

A slot 11 is formed near the front side of the cover plate slide 9, which slot opens to the front, where it is formed with a locating funnel 12; a slot portion 11' extends parallel to guide rail 1 behind said funnel, which slot portion 11' continues into an downwardly and rearwardly sloping slot portion 11". Said slot 11 is capable of cooperating with a lateral (coupling) cam 13 on the adjacent slide 2 of the folding roof. The cam 13 and the slot 11 jointly form a height adjusting mechanism for the cover plate 3.

The lateral cam 13 is present on a support which is in the form of a rearwardly extending pin 14, which can engage in a supporting slot 15 in the cover plate slide 9, which extends parallel to the guide rail 1. In the position of the folding roof in which the folding roof parts are interlocked to form one unit, the pin 14 is accommodated in the supporting slot 15 in its entirety, so that any forces that may be exerted on the cam 13, and thus on the pin 14, can be adequately absorbed.

The figure furthermore shows that a locking cam 16 is present on the underside of the link plate 6 of the cover plate 3, which cam is spaced from the pivot pin 7 by some distance, as a result of which it will move along in vertical direction with the cover plate upon pivoting of the link plate 6. In the lower, locked position of the cover plate 3, the locking cam 16 is in engagement with a locking recess 17 as a counter element for the locking element in the form of a locking cam 16 of the link plate 6. The cover plate 3 is locked in position in the longitudinal direction of the guide rail 1 as a result of the locking cam 16 engaging in the locking recess 17.

The underside of the locking cam 16 is slightly inclined, in such a manner that, in the upwardly pivoted position of the cover plate 3, the underside of the locking cam 16 extends at least substantially parallel to the guide rails 1, 5, resting on the bottom of said guide rail 5, as a result of which the locking cam 16 locks the respective link plate 6 in the upwardly pivoted position, thus preventing downward pivoting movement thereof. Thus it is ensured, in combination with the engagement of the cam 13 in the slot 11, that the cover plate 3 and the rear slide 2 are interlocked to form a unit in rearwardly moved positions. Since said rear slide 2 is also interlocked with preceding slides and with the operating beam, said parts are all interlocked to form one unit in rearwardly moved positions.

As is furthermore shown in the figure, the cover plate slide 9 includes a locking element 18 comprising a hook 19 that can hook behind a mating shoulder 20 on the link plate 6 in the downwardly pivoted, locked position of said link plate 6. The locking element 18 comprising the hook 19 is pivotable about a transverse extending pivot 21 on the cover plate slide 9. An engaging cam 22 is present on locking element 18 includes for actuation thereof, with which an actuating cam 23 on the rearwardly extending pin 14 of the adjacent slide 2 can make contact for pivoting the locking element 18 from a position in which it locks the link plate 6 in position to a position in which it releases the link plate. The engaging cam 22, and thus the locking element 18, is spring-loaded by a biasing spring 24 on the cover plate slide 9, which biases the locking element 18 to the position in which it locks the link plate 6 and thus the cover plate 3 in position.

The operation of the embodiment of the open roof construction according to the invention will now be described with reference to FIGS. 2–7.

FIG. 2 shows the folding roof in an almost entirely open position. In this position, the cover plate 3 is locked in position at the transition between the guide rail 1 and the guide rail 5. The rear slide 2 nears the cover plate 3. The cover plate 3 is locked in position with respect to the guide rail 1 as a result of the engagement of the locking cam 16 in the locking recess 17. The hook 19 of the locking element 18 engages round the shoulder 20 of the link plate 6 of the cover plate 3, so that the cover plate 3 is locked in the sealing position.

Figure 3:
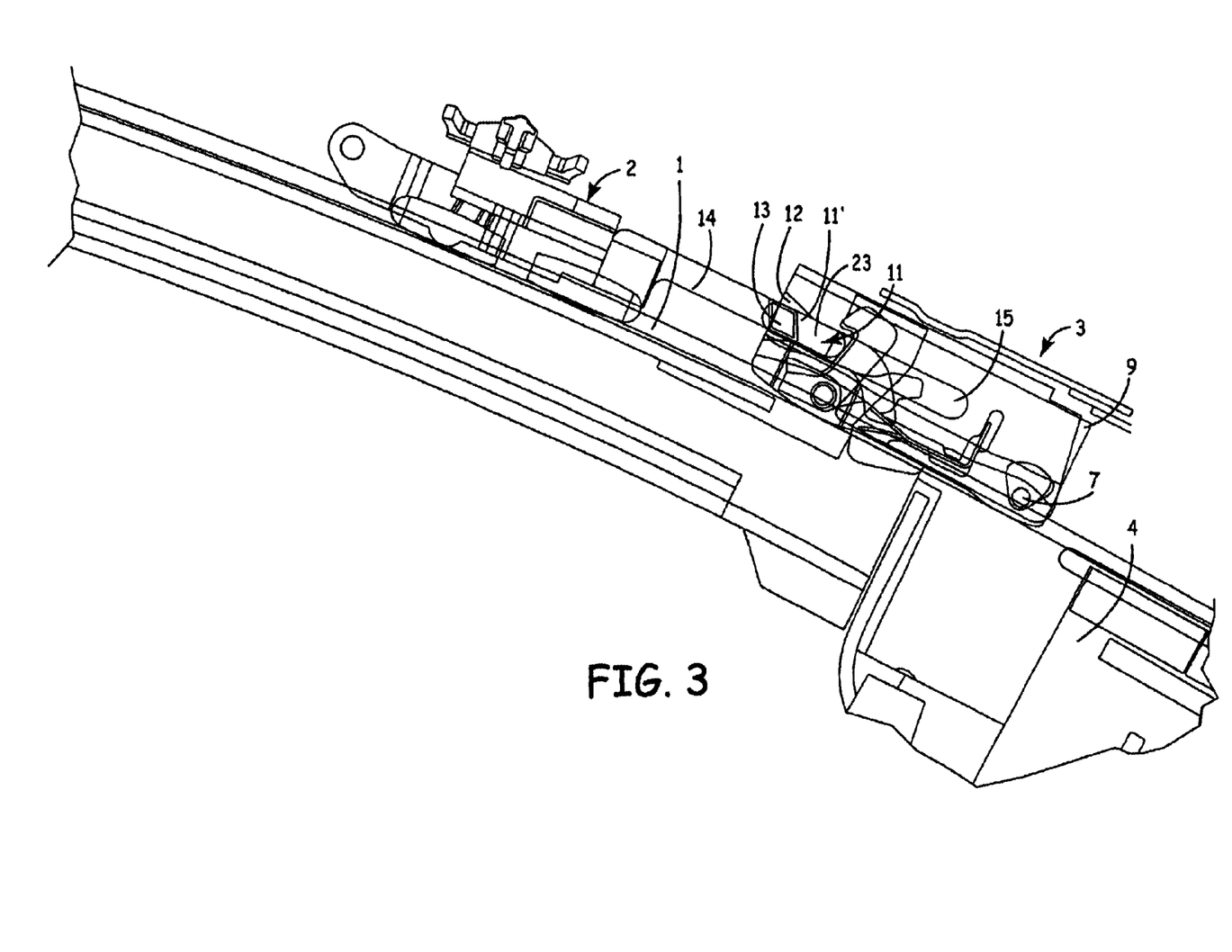

In FIG. 3, the rear slide 2 has been moved so far to the rear that the rear portion of the pin 14 of the slide has entered the supporting slot 15 and the lateral coupling cam 13 on said pin 14 has arrived at the beginning of the slot 11.

Figure 4:
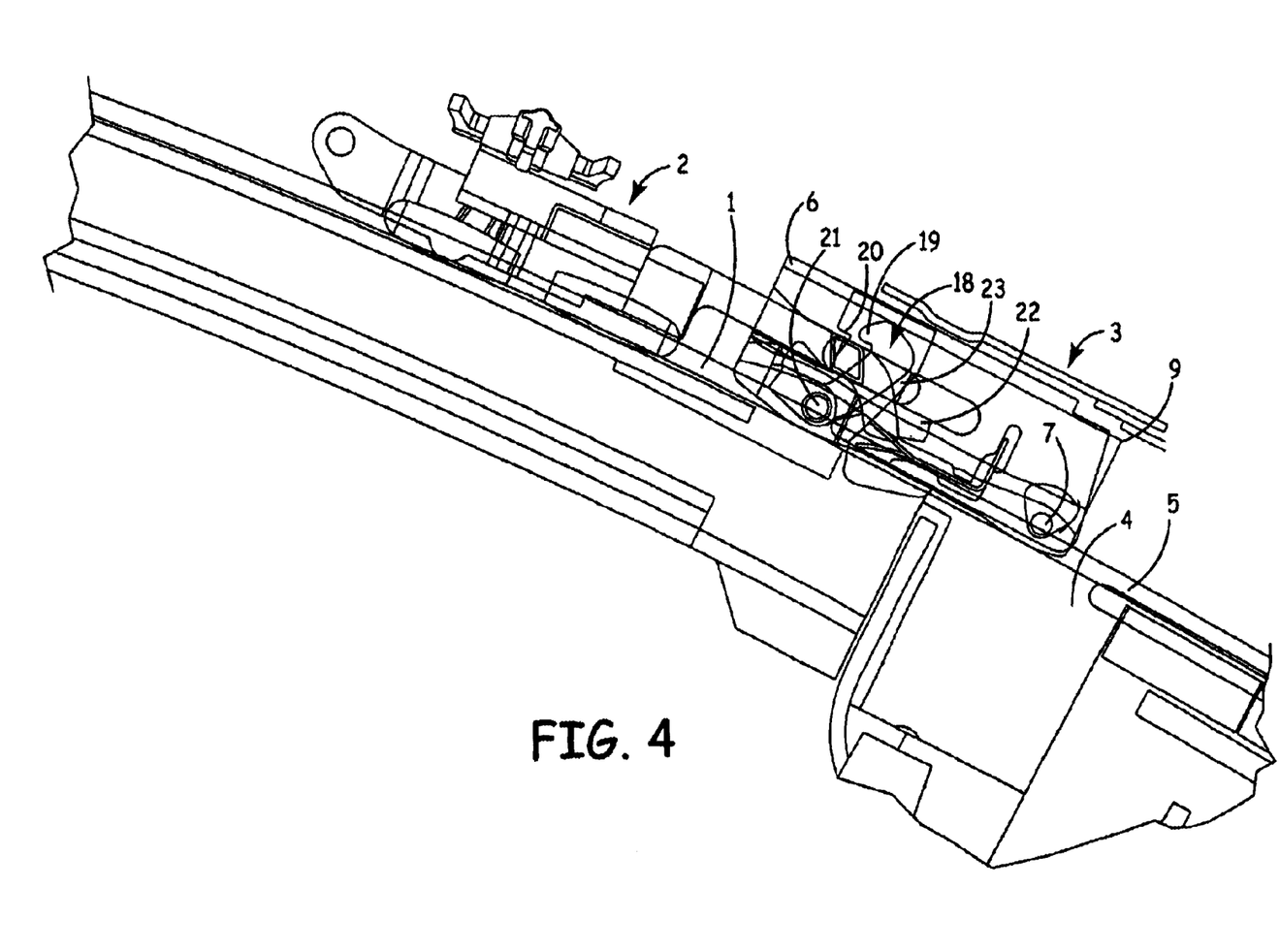

FIG. 4 shows the position in which the actuating cam 23 on the pin 14 of the slide 2 has come into engagement with the engaging cam 22 of the locking element 18 and has pivoted the locking element 18 about the traverse pivot 21, as a result of which the hook 19 has moved out of engagement with the shoulder 20. Now the link plate 6 of the cover plate 3 is released for pivoting movement about pivot pin 7.

Figure 5:
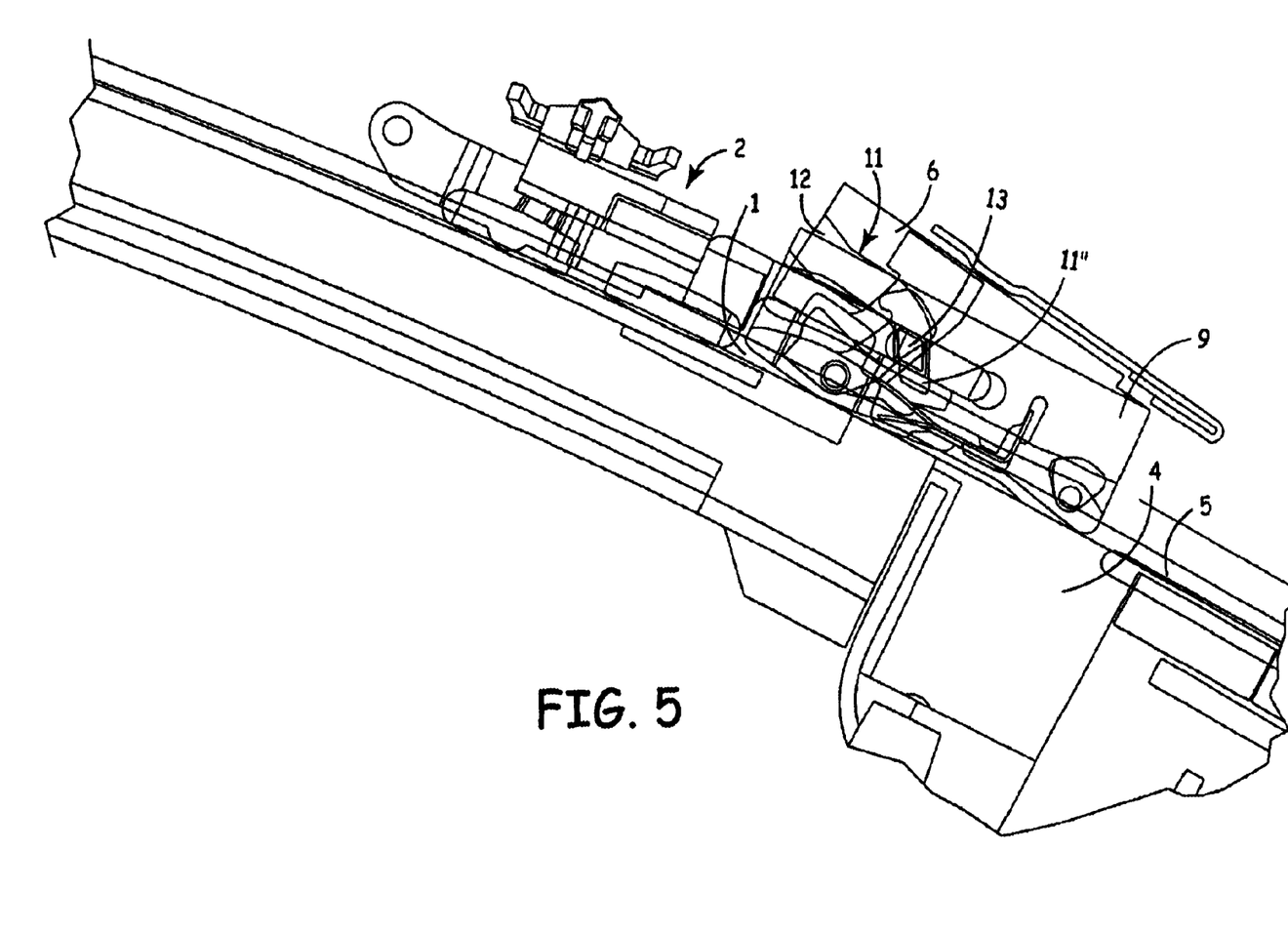

In the position that is shown in FIG. 5, said pivoting movement has started as a result of the movement of the coupling cam 13 in the sloping slot portion 11" of the slot 11. The only way in which the coupling pin 13, which is not movable in vertical direction, can move into said sloping slot portion 11' is through a pivoting movement of the link plate 6.

Figure 6:
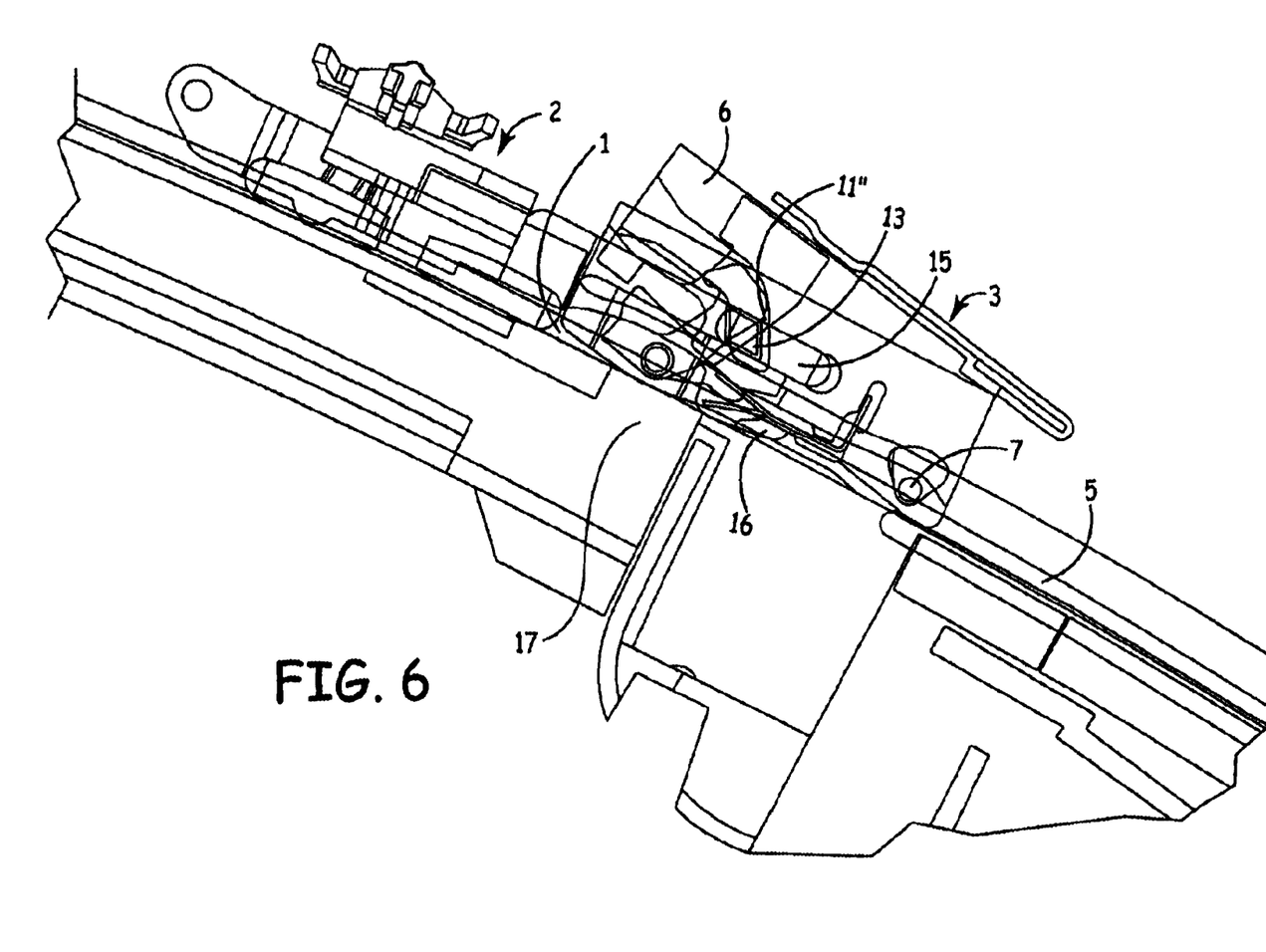

In FIG. 6, the link plate 6 has been pivoted so far upwards by the movement of the cam 13 in the slot 11 that the locking cam 16 has moved out of the locking recess 17, as a result of which cover plate 3 is no longer locked in position in guide rail 1. The cover plate 3 can now follow the rearward movement of the slide 2, as has already happened in FIG. 6. The locking cam 16 has moved above the bottom of the guide rail 1/5 and engages said guide rail, as a result of which the link plate 6 can no longer pivot downwards and the link plate 6 is thus locked against pivoting movement in this upper position. Accordingly, also slide 2 and cover plate 3 are locked in position, as a result of the engagement of the coupling cam 13 in the slot portion 11" of the slot 11. After all, the cam 13 can only move through slot 11 as a result of the pivoting movement of the link plate 6.

Figure 7:
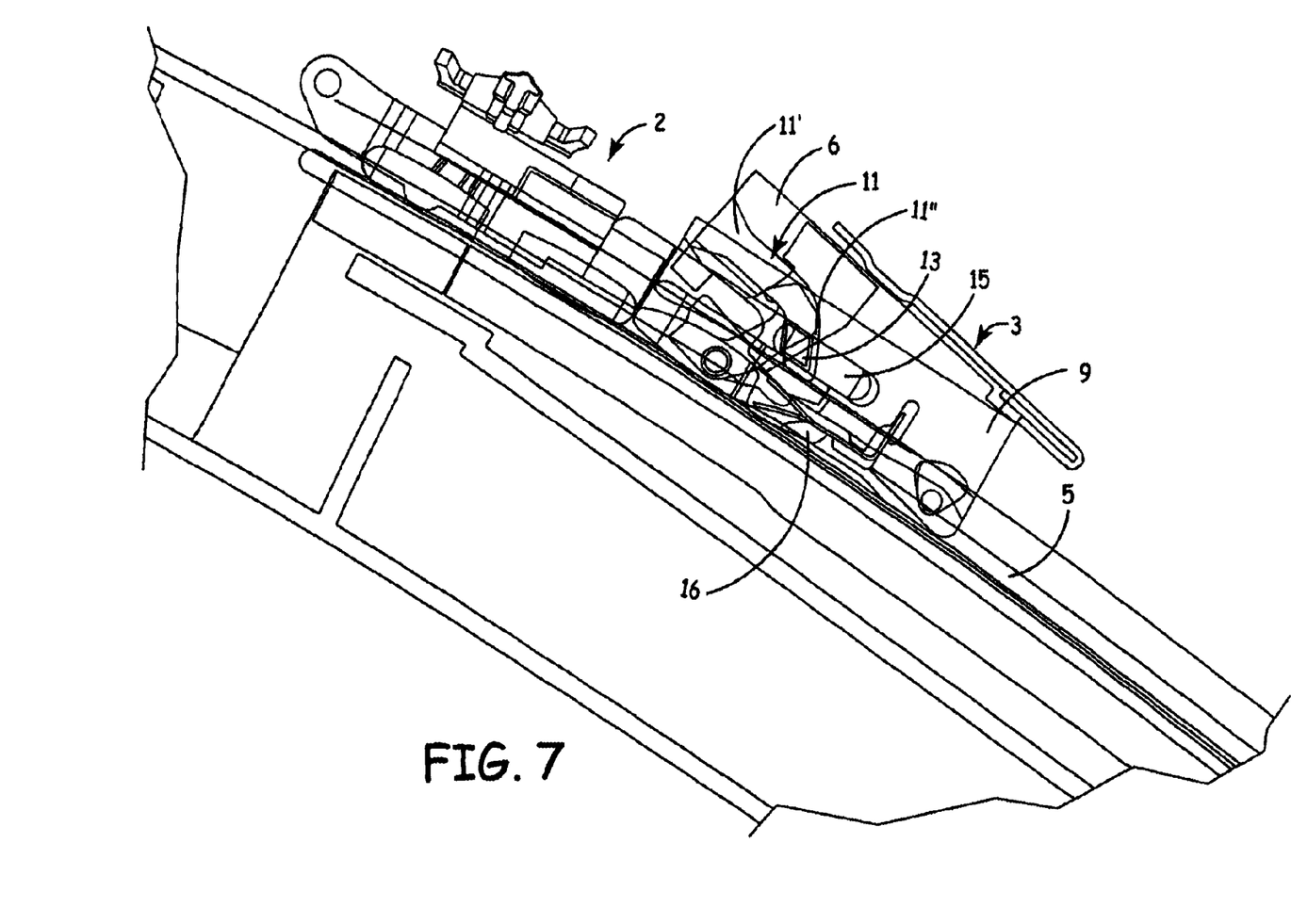

In FIG. 7, the unit consisting of cover plate 6 and slide 2 has been moved rearwards to a position on the rear window 4, so that the unit is present in the guide rail 5 of the rear window. In this way, the entire folding roof unit can be moved to a position on the rear window 4.

The return movement of the cover plate 3 takes place in a comparable, reverse manner. Also the locking of the cover plate 3 with respect to the guide rail 1 and the uncoupling of the slide 2 takes place in the reverse manner. The locking element 18 with the hook is forced back into the locked position again by the biasing spring 24.

From the foregoing it will be apparent that the invention provides a compact and reliable construction, which ensures that the cover plate 3 is correctly locked and unlocked and moved from and to the sealing position. The invention is not restricted to the use thereof with a folding roof. The principle of the invention can not only be used with a folding roof, but also with other roof types, such as a spoiler roof, a sliding roof, a slatted roof or a similar roof comprising a closure element other than a foldable liner.

What is claimed is:

1. An open roof construction for a vehicle having a roof opening in its fixed roof, comprising:

stationary guide rails securable on either side of the roof opening;

rear slides which are guided in the stationary guide rails for movably supporting a closure element of the open roof construction;

a cover plate, which defines a rear side of the roof opening that can be closed by the closure element, wherein the rear slides and the cover plate of the open roof construction are interlocked to form one unit in an entirely open position of the open roof construction, after which they can be moved further as a unit;

cover plate slides, wherein said cover plate is mounted on the cover plate slides capable of sliding movement in said stationary guide rails; and a height adjusting mechanism adapted for actuation by one of the rear slides of the closure element, the height adjusting mechanism functioning to move the cover plate upwards before further movement of the aforesaid unit is possible.

2. The open roof construction according to claim 1, wherein said height-adjusting mechanism is adapted for pivoting at least the cover plate about a pivot pin which is positioned near a rear side of the cover plate.

3. The open roof construction according to claim 1, wherein the height adjusting mechanism includes a lateral cam on each of the adjacent rear slides and a vertically extending slot provided on the cover plate.

4. The open roof construction according to claim 2, wherein the cover plate is fitted with a link plate at each end, where each link plate is pivotally connected to the associated cover plate slide.

5. The open roof construction according to claim 4, wherein a locking element is present at both ends of the cover plate, which locking elements are to cooperate with a counter element in the guide rails so as to lock the cover plate in position with respect to the guide rails as long as the rear slides and the cover plate of the open roof construction are not interlocked to form one unit in an entirely open position.

6. The open roof construction according to claim 5, wherein the movement of the cover plate in a vertical direction is used for locking the cover plate in a locking engagement with respect to the guide rails and releasing said locking engagement as well as for interlocking the rear slides and the cover plate in an interlocking engagement to form one unit and releasing said interlocking engagement.

7. The open roof construction according to claim 6, wherein the link plates of the cover plate are each provided on an underside thereof with a locking cam as the locking element which moves along with the vertical movement of the cover plate, whereas each counter element is in the form of a recess in the guide rail for receiving the associated locking cam.

8. The open roof construction according to claim 3, wherein the cover plate and the adjacent rear slides include mating coupling elements for coupling the adjacent rear slides to the cover plate in the entirely open position of the open roof construction.

9. The open roof construction according to claim 8, wherein the lateral cam and the slot of the height adjusting mechanism also function as the coupling elements, the coupling elements co-acting with a locking element to lock the cover plate in the upper position in rearwardly moved positions thereof.

10. The open roof construction according to claim 9, wherein the locking cams of the cover plate, together with the guide rails also function as the locking elements.

11. The open roof construction according to claim 4, wherein the link plates of the cover plate are locked against vertical movement with respect to the cover plate slides in a lower position by means of an associated locking element.

12. The open roof construction according to claim 11, wherein each locking element is pivotable about a traverse pivot on the associated cover plate slide, between a position in which it locks the cover plate in position and a position in which it releases the cover plate.

13. The open roof construction according to claim 11, wherein the locking elements each include a hook which engages a mating member on the associated link plate of the cover plate.

14. The open roof construction according to claim 11, wherein the locking elements are each loaded by a spring member to the position in which the cover plate is locked in position.

15. The open roof construction according to claim 14, wherein the adjacent rear slides each include an actuating element which is capable of actuating the associated locking element, at least from the locking position to the releasing position.

16. The open roof construction according to claim 15, wherein each actuating element and a coupling element are arranged on a support which can move into engagement with a supporting slot in the cover plate slide, which supporting slot extends parallel to the guide rail.

17. The open roof construction according to claim 16, wherein each support is in the form of a pin extending rearwards of the adjacent rear slide, from which the coupling element extend laterally.

18. A vehicle comprising:

a fixed roof with a roof opening;

stationary guide rails on either side of the roof opening;

rear slides which are guided in the stationary guide rails for movably supporting a closure element of the open roof construction;

a cover plate, which defines a rear side of the roof opening that can be closed by the closure element, wherein the rear slides and the cover plate of the open roof construction are interlocked to form one unit in an entirely open position of the open roof construction, after which they can be moved further as a unit;

cover plate slides, wherein said cover plate is mounted on the cover plate slides capable of sliding movement in said stationary guide rails; and a height adjusting mechanism adapted for actuation by one of the rear slides of the closure element, the height adjusting mechanism functioning to move the cover plate upwards before further movement of the aforesaid unit is possible.

\* \* \* \* \*

UNITED STATES PATENT AND TRADEMARK OFFICE
CERTIFICATE OF CORRECTION

PATENT NO. : 6,926,354 B2
DATED : August 9, 2005
INVENTOR(S) : Paulus Johannes Wilhelminus Munsters and Marcel John Christiaan Nellen It is certified that error appears in the above-identified patent and that said Letters Patent is hereby corrected as shown below:

<u>Title page,</u>
Item [75], Inventors, add -- Marcel John Christiaan Nellen, Venray (NL) --.

Signed and Sealed this

Fifteenth Day of November, 2005

JON W. DUDAS
*Director of the United States Patent and Trademark Office*